(12) United States Patent
Mennecke et al.

(10) Patent No.: US 11,613,682 B2
(45) Date of Patent: Mar. 28, 2023

(54) FLAME-RETARDANT ADHESIVE AND SEALANT WITH IMPROVED MECHANICAL PROPERTIES

(71) Applicant: SIKA TECHNOLOGY AG, Baar (CH)

(72) Inventors: Klaas Mennecke, Lottstetten (DE); Sven Reimann, Zürich (CH); Marcel Oertli, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 16/309,897

(22) PCT Filed: Jul. 21, 2017

(86) PCT No.: PCT/EP2017/068518
§ 371 (c)(1),
(2) Date: Dec. 13, 2018

(87) PCT Pub. No.: WO2018/015552
PCT Pub. Date: Jan. 25, 2018

(65) Prior Publication Data
US 2019/0169476 A1    Jun. 6, 2019

(30) Foreign Application Priority Data
Jul. 21, 2016   (EP) ..................... 16180523

(51) Int. Cl.
| | | |
|---|---|---|
| *C09J 11/04* | (2006.01) | |
| *C09J 11/06* | (2006.01) | |
| *C09J 175/04* | (2006.01) | |
| *C08K 3/04* | (2006.01) | |
| *C08G 18/28* | (2006.01) | |
| *C08K 5/521* | (2006.01) | |
| *C08K 9/04* | (2006.01) | |
| *C08G 18/48* | (2006.01) | |
| *C08G 18/12* | (2006.01) | |
| *C09D 175/08* | (2006.01) | |
| *C08G 18/76* | (2006.01) | |
| *C08G 18/32* | (2006.01) | |
| *C08G 18/75* | (2006.01) | |
| *C08G 18/30* | (2006.01) | |
| *C08K 9/06* | (2006.01) | |
| *C08K 5/00* | (2006.01) | |
| *C08K 3/016* | (2018.01) | |
| *C08K 3/22* | (2006.01) | |

(52) U.S. Cl.
CPC ............ *C09J 175/04* (2013.01); *C08G 18/12* (2013.01); *C08G 18/289* (2013.01); *C08G 18/307* (2013.01); *C08G 18/3256* (2013.01); *C08G 18/485* (2013.01); *C08G 18/4812* (2013.01); *C08G 18/4825* (2013.01); *C08G 18/4829* (2013.01); *C08G 18/755* (2013.01); *C08G 18/7621* (2013.01); *C08K 3/016* (2018.01); *C08K 3/04* (2013.01); *C08K 5/0016* (2013.01); *C08K 5/521* (2013.01); *C08K 9/04* (2013.01); *C08K 9/06* (2013.01); *C09D 175/08* (2013.01); *C09J 11/04* (2013.01); *C09J 11/06* (2013.01); *C08K 3/22* (2013.01); *C08K 2003/2227* (2013.01)

(58) Field of Classification Search
CPC .......... C09J 11/04; C09J 11/06; C09J 175/04; C08K 3/04
See application file for complete search history.

(56) References Cited

U.S. PATENT DOCUMENTS

| | | | |
|---|---|---|---|
| 4,469,831 A | 9/1984 | Bueltjer et al. | |
| 4,822,830 A * | 4/1989 | Adkins | .................... C08K 9/06 427/341 |
| 4,853,454 A | 8/1989 | Merger et al. | |
| 5,087,661 A | 2/1992 | Aoki et al. | |
| 5,364,955 A | 11/1994 | Zwiener et al. | |
| 6,228,914 B1 * | 5/2001 | Ford | ...................... C09D 5/185 252/609 |
| 2003/0220407 A1 | 11/2003 | Chaignon et al. | |

(Continued)

FOREIGN PATENT DOCUMENTS

| | | | | |
|---|---|---|---|---|
| CN | 104861912 A * | 8/2015 | .............. | C09J 11/04 |
| DE | 38 13 251 A1 | 11/1989 | | |

(Continued)

OTHER PUBLICATIONS

Wicks et al., "Blocked isocyanates III: Part A. Mechanisms and chemistry," Progress in Organic Coatings, 1999, vol. 36, pp. 148-172.

(Continued)

*Primary Examiner* — Bijan Ahvazi
(74) *Attorney, Agent, or Firm* — Oliff PLC

(57) ABSTRACT

A moisture-curable composition having flame retardant properties and to the use thereof as an adhesive, sealant or coating. The composition according to the invention contains at least one moisture-reactive polymer in a proportion of 10% to 50% by weight, at least one precipitated, surface-coated aluminum trihydrate in a proportion of 30% to 60% by weight and in preferred embodiments up to 25% by weight of at least one phosphorus-containing compound and up to 20% by weight of at least one carbon additive. The inventive moisture-curable composition has excellent flame retardant properties and after curing remains resistant for a long time at high heat levels.

11 Claims, No Drawings

(56) References Cited

U.S. PATENT DOCUMENTS

| | | | | |
|---|---|---|---|---|
| 2006/0160978 A1* | 7/2006 | Gupta | ............. | C08G 18/48 |
| | | | | 528/44 |
| 2008/0284106 A1 | 11/2008 | Maton et al. | | |
| 2010/0209705 A1* | 8/2010 | Lin | ............. | C08L 51/06 |
| | | | | 428/391 |
| 2012/0216952 A1* | 8/2012 | Bushendorf | ............. | C08G 18/10 |
| | | | | 156/331.4 |
| 2012/0298300 A1* | 11/2012 | Oertli | ............. | C08G 18/10 |
| | | | | 156/329 |

FOREIGN PATENT DOCUMENTS

| | | | |
|---|---|---|---|
| DE | 42 31 342 C1 | 5/1994 | |
| DE | 38 54 185 T2 | 12/1995 | |
| EP | 0 791 613 A1 | 8/1997 | |
| EP | 1 772 447 A1 | 4/2007 | |
| EP | 1 975 217 A2 | 10/2008 | |
| EP | 2 199 351 A1 | 6/2010 | |
| JP | 2003-12879 A | 1/2003 | |
| JP | 2007-84633 A | 4/2007 | |
| JP | 2013-6946 A | 1/2013 | |
| WO | WO-2011160832 A3 * | 5/2012 | ............. C08K 7/24 |
| WO | 2014/114643 A1 | 7/2014 | |
| WO | WO-2014114643 A1 * | 7/2014 | ............. C09D 175/12 |

OTHER PUBLICATIONS

Wicks et al., "Blocked isocyanates III Part B: Uses and applications of blocked isocyanates," Progress in Organic Coatings, 2001, vol. 41, pp. 1-83.

Oct. 20, 2017 International Search Report issued in International Patent Application No. PCT/EP2017/068518.

Jan. 22, 2019 International Preliminary Report on Patentability issued in International Patent Application No. PCT/EP2017/068518.

Translation of Weiping et al. "Fine Chemistry Products and Processes," East China University of Science and Technology Press, 2009, pp. 1-6.

Bauxit, Chemie.de, https://www.chemie.de/lexikon/Bauxit.html (accessed Dec. 17, 2021), 3 pages.

* cited by examiner

FLAME-RETARDANT ADHESIVE AND SEALANT WITH IMPROVED MECHANICAL PROPERTIES

TECHNICAL FIELD

The invention relates to moisture-curable compositions having flame retardant properties and to the use thereof as adhesive and sealant compositions and also coatings.

PRIOR ART

Moisture-curable compositions play a significant role in many industrial applications, for example as one-component adhesives, sealants or coatings. The curing thereof is brought about by crosslinking reactions which proceed under the influence of water via free or latent reactive groups such as for example isocyanate groups or silane groups, wherein these react with themselves or one another by contact with moisture, mainly from air, and thus covalently bond the constructional components present in the composition to afford a polymeric network.

Depending on the field of application a very wide range of products having versatile individual properties may be formulated in the sector of moisture-curable compositions. Playing an important role here are especially admixtures such as for example fillers, plasticizers, additives and adhesion promoters which have a substantial effect on the properties of the formulation, for example adhesion, mechanics and processability. Thus also known are moisturize-curable compositions which have flame retardant properties and high thermal stability and may be employed in locations where fire retardancy is desirable or even necessary such as for example in buildings, means of transport, electricals, storage facilities for highly flammable substances or piping systems.

Traditionally employed are especially silicone-based adhesive and sealant compositions and also coatings since silicones are known to have good thermal stability and are thus technically suitable for fire retardancy applications. On the other hand silicones generally show a comparatively poor adhesion on many substrates and cannot be painted over and have a propensity for permanent stain formation by plasticizer migration onto porous substrates.

Moisture-curable compositions based on polyurethane or based on silane-modified polymers are per se less thermally stable than silicones but do not exhibit the abovementioned disadvantages. Furthermore, they may be formulated in relatively versatile fashion, as mentioned, in order to improve their flame retardant properties and thus to achieve fire retardant properties that are similarly positive to those of silicone.

In order to retard or even completely prevent combustion flame retardants are therefore typically used as a formulation constituent. Known flame retardants include for example organic flame retardants, such as halogen-containing flame retardants and, on account of reduced toxicity and environmental concerns, increasingly phosphorus-containing substances which form an intumescent interlayer under the action of flames.

The application EP 1975217 describes for example flame-retarded adhesive and sealing compositions containing a monophospinic acid or diphosphinic acid salt as the flame retardant. However, the additization with such a flame retardant generally has a negative effect on the adhesive properties of an adhesive formulation. Adhesive bonding is thus altogether weakened by the use of an additive flame retardant. A further frequently used additive based on phosphorus is ammonium polyphosphate. However, studies have shown that the use of ammonium polyphosphate in a one-component polyurethane-based sealing composition can result in complete loss of the storage stability of such a composition.

Other intumescents likewise often have a disadvantageous effect on the mechanical properties of the compositions. DE-A-38 13 251 describes for example an intumescent one-component fire retardant composition based on a polyurethane binder and expandable graphite as the intumescent, wherein the polyurethane binder has a residual content of free isocyanate groups.

However, such compositions exhibit for example a severely reduced elasticity which limits their use as sealants.

A further frequently used option is the use of fillers which eliminate water under the action of heat. The best-known example is aluminum hydroxide, also known as aluminum trihydrate (ATH). However, due to the customary high content of residual moisture fillers of this type have only limited suitability for one-component, moisture-curable compositions since in some cases they cause the moisture-curable compositions to react fully even in their closed containers and thus do not allow sufficient storage stability. This problem has been countered by drying such fillers in advance. Thus for example EP 0 791 613 describes storage-stable, one-component compositions whose fillers such as ATH have been dried by various processes before formulation. However, such moisture-curable compositions containing ATH or other water-eliminating mineral fillers generally still exhibit disadvantages even after the drying of these fillers. It is thus known that while these fillers improve fire properties they have a negative effect on the mechanics of the cured compositions, in particular tensile strength and elongation at break.

There therefore remains a need for a moisture-curable composition which does not exhibit the abovementioned disadvantages of the prior art.

SUMMARY OF THE INVENTION

The present invention accordingly has for its object to provide a moisture-curable composition which has excellent flame retardant properties and after curing remains resistant for a long time at high heat levels, is storage-stable in its container and after curing has very good mechanical properties, in particular in terms of tensile strength, elongation at break and tensile shear strength. This object is achieved, surprisingly, by a moisture-curable composition as described in claim 1. The use of precipitated, surface-coated aluminum trihydrate (ATH) in a sufficient amount in a composition based on moisture-reactive polymers can surprisingly achieve properties in the formulation product that are not possible with conventional ATH. Further optional constituents also allow in particular embodiments not only the unexpected mechanical properties but also excellent fire retardancy properties which make it possible to achieve stringent fire retardancy standard classes.

Further aspects of the invention form the subject matter of further independent claims. Particularly preferred embodiments of the invention form the subject matter of the dependent claims.

Ways of Executing the Invention

The invention provides a moisture-curable composition, comprising
  a) at least one moisture-reactive polymer P in a proportion of 10% to 50% by weight based on the total composition,
  b) at least one precipitated, surface-coated aluminum trihydrate ATH in a proportion of 30% to 60% by weight based on the total composition,
  c) between 0% and 25% by weight based on the total composition of at least one phosphorus-containing compound PH,
  d) between 0% and 20% by weight based on the total composition of at least one carbon additive KO.

The term "silane group" refers to a silyl group bonded to an organic radical and having one to three, especially two or three, hydrolyzable substituents on the silicon atom. Particularly commonly used hydrolyzable substituents are alkoxy radicals. These silane groups are also referred to as "alkoxysilane groups". Silane groups may also be in partly or fully hydrolyzed form.

"Hydroxysilane", "isocyanatosilane", "am inosilane" and "mercaptosilane" refer respectively to organoalkoxysilanes having one or more hydroxyl, isocyanato, amino or mercapto groups on the organic radical in addition to the silane group.

Substance names beginning with "poly", such as polyol or polyisocyanate, refer to substances containing, in a formal sense, two or more of the functional groups that occur in their name per molecule.

The term "organic polymer" encompasses a collective of macromolecules that are chemically homogeneous but differ in relation to degree of polymerization, molar mass and chain length, which has been prepared by a poly reaction (polymerization, polyaddition, polycondensation) and has a majority of carbon atoms in the polymer backbone, and reaction products of such a collective of macromolecules.

The term "polyurethane polymer" encompasses all polymers produced according to the so-called diisocyanate polyaddition process. This also includes polymers that are virtually or completely free from urethane groups. Examples of polyurethane polymers are polyether polyurethanes, polyester polyurethanes, polyether polyureas, polyureas, polyester polyureas, polyisocyanurates and polycarbodiimides.

Silane-containing polymers are in particular silane-containing organic polymers which are typically, and particularly in this document, synonymously also described as "silane-functional polymers", "silane-modified polymers" (SMP) or "silane-terminated polymers" (STP). The crosslinking thereof proceeds via the condensation of silanol groups to form siloxane bonds and is conventionally catalyzed by means of organotin compounds such as dialkyltin (IV) carboxylates in particular.

The term "silane-containing polyether" also encompasses organic silane-containing polymers which, in addition to polyether units, may also contain urethane groups, urea groups or thiourethane groups. Such silane-containing polyethers may also be referred to as "silane-containing polyurethanes".

"Molecular weight" is understood in the present document to mean the molar mass (in grams per mole) of a molecule or part of a molecule, also referred to as a "radical". "Average molecular weight" denotes the number-average $M_n$ of an oligomeric or polymeric mixture of molecules or radicals, which is typically determined by means of gel permeation chromatography (GPC) against polystyrene as standard.

"Storage-stable" or "storable" refers to a substance or composition if it can be stored at room temperature in a suitable container over a prolonged period, typically from at least 3 months up to 6 months or more, without any change in its application or use properties, especially in the viscosity and crosslinking rate, to an extent relevant for the use thereof, as a result of the storage.

A dotted line in the formulae in this document in each case represents the bond between a substituent and the corresponding molecular radical.

"Room temperature" refers to a temperature of about 23° C.

All industry standards mentioned in this document relate to the version valid at the date of first filing.

The terms "mass" and "weight" are used synonymously in this document. Thus a "percentage by weight" (% by weight) is a percentage mass fraction which unless otherwise stated relates to the mass (the weight) of the total composition or, depending on the context, of the entire molecule.

A moisture-curable composition in the context of the present invention is in particular
  a polyurethane composition, especially a two-component system that crosslinks by reaction of polyols with isocyanates, as used, for example, for adhesives, coverings, potting compounds, sealing joints, moldings or slabstock foams, or a one-component system having blocked (latent) isocyanate groups or blocked (latent) amino groups, as used, for example, in powder coatings, coil coatings, electrocoat materials or liquid paints; or
  a composition based on silane-functional (silane-containing) polymers. Compositions based on silane-functional polymers cure rapidly even at relatively low catalyst concentrations and show good adhesion behavior on many substrates even without the use of primers. They are also toxicologically advantageous due to the lack of isocyanates.

Thus preferably suitable as the moisture-reactive polymer P in the context of the present invention are polyurethane polymers PU having free or latent isocyanates and silane-functional polymers STP.

The composition according to the invention contains the at least one moisture-reactive polymer P in a proportion of 10% to 50% by weight, preferably 15% to 30% by weight, based on the total composition.

In one embodiment the moisture-reactive polymer P comprises at least one polyurethane polymer PU having free or latent isocyanate groups. Suitable isocyanate-comprising polyurethane polymers PU for producing a composition according to the invention are for example polymers obtainable by the reaction of at least one polyol with at least one polyisocyanate, in particular a diisocyanate. This reaction may be effected when the polyol and the polyisocyanate are reacted with customary processes, for example at temperatures of 50° C. to 100° C., optionally with co-use of suitable catalysts, wherein the polyisocyanate has been dosed such that the isocyanate groups thereof are in a stoichiometric excess in relation to the hydroxyl groups of the polyol.

In particular, the excess of polyisocyanate is chosen such that in the resulting polyurethane polymer after the reaction of all hydroxyl groups of the polyol a content of free isocyanate groups of 0.1% to 5% by weight, preferably 0.2% to 3% by weight, particularly preferably 0.3% to 2.5% by weight, based on the total polymer, remains.

The polyurethane polymer PU may optionally be produced with co-use of plasticizers, wherein the employed plasticizers contain no isocyanate-reactive groups.

Preference is given to polyurethane polymers having the recited content of free isocyanate groups obtained from the reaction of diisocyanates with high molecular weight diols in an NCO:OH ratio of 1.3:1 to 4:1, in particular 1.5:1 to 3:1 and particularly preferably 1.7:1 to 2.5:1.

Suitable polyols for the production of the isocyanate-comprising polyurethane polymer are in particular polyether polyols, styrene-acrylonitrile-grafted polyether polyols, polyester polyols, polycarbonate polyols, poly(meth)acrylate polyols, polyhydroxyl-functional fats and oils or polyhydrocarbon polyols and also mixtures of these polyols.

Suitable polyether polyols, also known as polyoxyalkylene polyols or oligoetherols, are in particular those which are polymerization products of ethylene oxide, 1,2-propylene oxide, 1,2- or 2,3-butylene oxide, oxetane, tetrahydrofuran or mixtures thereof, optionally polymerized with the aid of a starter molecule having two or more active hydrogen atoms such as for example water, ammonia or compounds having a plurality of OH or NH groups, for example 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, and mixtures of the recited compounds. Employable are both polyoxyalkylene polyols having a low degree of unsaturation (measured according to ASTM D-2849-69 and reported in milliequivalents of unsaturation per gram of polyol (mEq/g)) produced for example using so-called double metal cyanide complex catalysts (DMC catalysts) and polyoxyalkylene polyols having a relatively high degree of unsaturation produced for example using anionic catalysts such as NaOH, KOH, CsOH or alkali metal alkoxides.

Particularly suitable are polyoxyethylene polyols and polyoxypropylene polyols, in particular polyoxyethylene diols, polyoxypropylene diols, polyoxyethylene triols and polyoxypropylene triols.

Especially suitable are polyoxyalkylene diols or polyoxyalkylene triols having a degree of unsaturation below 0.02 mEq/g and having a molecular weight in the range from 1000 to 30 000 g/mol and also polyoxyethylene diols, polyoxyethylene triols, polyoxypropylene diols and polyoxypropylene triols having a molecular weight of 400 to 20 000 g/mol.

Likewise particularly suitable are so-called ethylene oxide-terminated ("EO-endcapped", ethylene oxide-endcapped) polyoxypropylene polyols. The latter are special polyoxypropylene polyoxyethylene polyols which are for example obtained when pure polyoxypropylene polyols, in particular polyoxypropylenediols and triols, after completion of the polypropoxylation reaction are further alkoxylated with ethylene oxide and thus have primary hydroxyl groups. Preferred in this case are polyoxypropylene polyoxyethylene diols and polyoxypropylene polyoxyethylene triols.

Suitable as polyester polyols are in particular polyesters which bear at least two hydroxyl groups and are produced by known processes, in particular polycondensation of hydroxycarboxylic acids or polycondensation of aliphatic and/or aromatic polycarboxylic acids with dihydric or polyhydric alcohols. Especially suitable are polyester polyols produced from divalent to trivalent alcohols such as for example 1,2-ethanediol, diethylene glycol, 1,2-propanediol, dipropylene glycol, 1,4-butanediol, 1,5-pentanediol, 1,6-hexanediol, neopentyl glycol, glycerol, 1,1,1-trimethylolpropane or mixtures of the aforementioned alcohols with organic dicarboxylic acids or the anhydrides or esters thereof such as for example succinic acid, glutaric acid, adipic acid, trimethyladipic acid, suberic acid, azelaic acid, sebacic acid, dodecanedicarboxylic acid, maleic acid, fumaric acid, dimer fatty acid, phthalic acid, phthalic anhydride, isophthalic acid, terephthalic acid, dimethyl terephthalate, hexahydrophthalic acid, trimellitic acid and trimellic anhydride or mixtures of the aforementioned acids and polyester polyols formed from lactones such as for example ε-caprolactone.

Particularly suitable are polyester diols, in particular those produced from adipic acid, azelaic acid, sebacic acid, dodecanedicarboxylic acid, dimer fatty acid, phthalic acid, isophthalic acid and terephthalic acid as the dicarboxylic acid or from lactones such as for example ε-caprolactone and from ethylene glycol, diethylene glycol, neopentyl glycol, 1,4-butanediol, 1,6-hexanediol, dimer fatty acid diol and 1,4-cyclohexanedimethanol as the divalent alcohol.

Suitable polycarbonate polyols are in particular those obtainable by reaction for example of the abovementioned alcohols used to construct the polyester polyols with dialkyl carbonates such as dimethyl carbonate, diaryl carbonates such as diphenyl carbonate or phosgene. Polycarbonate diols, in particular amorphous polycarbonate diols, are particularly suitable.

Further suitable polyols are poly(meth)acrylate polyols.

Also suitable are polyhydroxyl-functional fats and oils, for example natural fats and oils, in particular castor oil, or so-called oleochemical polyols obtained by chemical modification of natural fats and oils, the epoxy polyesters or epoxy polyethers obtained for example by epoxidation of unsaturated oils and subsequent ring opening with carboxylic acids or alcohols, respectively, or polyols obtained by hydroformylation and hydrogenation of unsaturated oils. Also suitable are polyols obtained from natural fats and oils by degradation processes such as alcoholysis or ozonolysis and subsequent chemical linking, for example by transesterification or dimerization, of the thus obtained degradation products or derivatives thereof. Suitable degradation products of natural fats and oils are especially fatty acids and fatty alcohols and also fatty acid esters, especially the methyl esters (FAME), which can be derivatized to hydroxy fatty acid esters by hydroformylation and hydrogenation for example.

Likewise suitable are moreover polyhydrocarbon polyols, also known as oligohydrocarbonols, for example polyhydroxy-functional ethylene-propylene, ethylene-butylene or ethylene-propylene-diene copolymers, such as are produced for example by Kraton Polymers, USA, or polyhydroxy-functional copolymers of dienes such as 1,3-butanediene or diene mixtures and vinyl monomers such as styrene, acrylonitrile or isobutylene, or polyhydroxy-functional polybutadiene polyols, for example those that have been prepared by oxidation of polybutadiene or copolymerization of 1,3-butadiene and allyl alcohol and may also have been hydrogenated.

Also suitable are polyhydroxy-functional acrylonitrile/butadiene copolymers, such as may be produced for example from epoxides or amino alcohols and carboxyl-terminated acrylonitrile/butadiene copolymers which are available commercially under the name Hypro® CTBN from Emerald Performance Materials, LLC, USA.

These recited polyols preferably have an average molecular weight of 250 to 30 000 g/mol, in particular from 1000 to 20 000 g/mol, and an average OH functionality in the range from 1.6 to 3.

Particularly suitable polyols are polyether polyols, in particular polyoxyethylene polyol, polyoxypropylene polyol, and polyoxypropylene polyoxyethylene polyol, preferably polyoxyethylene diol, polyoxypropylene diol, polyoxyethylene triol, polyoxypropylene triol, polyoxypropylene polyoxyethylene diol and polyoxypropylene polyoxyethylene triol.

Also co-usable in the production of the terminal isocyanate-comprising polyurethane polymer, in addition to these polyols mentioned, are small amounts of low molecular weight dihydric or polyhydric alcohols such as for example 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, hydrogenated bisphenol A, dimeric fatty alcohols, 1,1,1-trimethylolethane, 1,1,1-trimethylolpropane, glycerol, pentaerythritol, sugar alcohols such as xylitol, sorbitol or mannitol, sugars such as sucrose, other higher polyhydric alcohols, low molecular mass alkoxylation products of the aforementioned dihydric and polyhydric alcohols and mixtures of the aforementioned alcohols.

Employable polyisocyanates for the production of the polyurethane polymer include commercially available polyisocyanates, in particular diisocyanates. Examples of suitable diisocyanates include 1,6-hexamethylene diisocyanate (HDI), 2-methylpentamethylene 1,5-diisocyanate, 2,2,4- and 2,4,4-trimethyl-1,6-hexamethylene diisocyanate (TMDI), 1,12-dodecamethylene diisocyanate, lysine and lysine ester diisocyanate, cyclohexane 1,3-diisocyanate, cyclohexane 1,4-diisocyanate, 1-isocyanato-3,3,5-trimethyl-5-isocyanatomethylcyclohexane (=isophorone diisocyanate or IPDI), perhydro-2,4'-diphenylmethane diisocyanate and perhydro-4,4'-diphenylmethane diisocyanate, 1,4-diisocyanato-2,2,6-trimethylcyclohexane (TMCDI), 1,3- and 1,4-bis(isocyanatomethyl)cyclohexane, m- and p-xylylene diisocyanate (m- and p-XDI), m- and p-tetramethyl-1,3-xylylene diisocyanate, m- and p-tetramethyl-1,4-xylylene diisocyanate, bis(1-isocyanato-1-methylethyl)naphthalene, 2,4- and 2,6-tolylene diisocyanate (TDI), 4,4'-, 2,4'-, and 2,2'-diphenylmethane diisocyanate (MDI), 1,3- and 1,4-phenylene diisocyanate, 2,3,5,6-tetramethyl-1,4-diisocyanatobenzene, naphthalene 1,5-diisocyanate (NDI), 3,3'-dimethyl-4,4'-diisocyanatobiphenyl (TODI), oligomers and polymers of the aforesaid isocyanates, and also any desired mixtures of the abovementioned isocyanates, wherein MDI and TDI are particularly preferred.

In the composition according to the invention the isocyanate-comprising polyurethane polymer PU is preferably present in an amount of 10% by weight to 50% by weight, in particular in an amount of 15% by weight to 30% by weight, based on the total composition.

In one-component compositions containing the isocyanate-comprising polyurethane polymer PU it may be advantageous to block and thus make latent the isocyanate groups in order to increase storage stability by preventing premature reaction in the container.

The blocking of the isocyanate groups to produce blocked or latent isocyanate groups via appropriate blocking agents which can undergo thermoreversible reaction with isocyanate groups is a customary measure in the art and a person skilled in the art can readily perform said blocking. A person skilled in the art is familiar with a wide number of suitable blocking agents/blocking groups, for example from the review articles of Douglas A. Wick in Progress in Organic Coatings 36 (1999), 148-172 and in Progress in Organic Coatings 41 (2001), 1-83 to which reference is hereby made.

Another in some cases yet more advantageous method for stabilizing one-component polyurethane compositions is the use of latent curing agents. These are blocked (latent) polyamines which under the influence of for example water lose their blocking group and react to form free amines which then react with the isocyanates to undergo crosslinking in a rapid reaction. Such blocked amines as latent curing agents are also very well known to a person skilled in the art and a person skilled in the art will find in the prior art many options for producing and using latent amines. These are described for example in U.S. Pat. Nos. 4,469,831, 4,853,454 and 5,087,661 and also in EP 1772447 to which reference is hereby made.

In a further embodiment the moisture-reactive polymer P comprises at least one silane-functional polymer STP.

The silane-functional polymer STP is preferably an organic polymer containing silane groups, in particular a polyolefin, polyester, polyamide, poly(meth)acrylate or polyether or a mixed form of these polymers, each of which bears one or preferably more than one silane group. The silane groups may be in pendant positions in the chain or in terminal positions and are bonded to the organic polymer via a carbon atom.

It is particularly preferable when the silane-containing organic polymer is a silane-containing polyolefin or a silane-containing polyester or a silane-containing poly(meth)acrylate or a silane-containing polyether or a mixed form of these polymers.

It is most preferable when the silane-containing organic polymer is a silane-containing polyether.

As silane groups the silane-containing organic polymer preferably comprises alkoxysilane groups, especially alkoxysilane groups of formula (I)

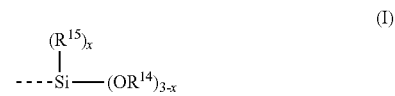

(I)

wherein $R^{14}$ is a linear or branched monovalent hydrocarbyl radical having 1 to 5 carbon atoms, especially methyl or ethyl or isopropyl;

$R^{15}$ is a linear or branched monovalent hydrocarbyl radical having 1 to 8 carbon atoms, especially methyl or ethyl; and x has a value of 0 or 1 or 2, preferably 0 or 1, especially 0.

It is particularly preferable when $R^{14}$ is methyl or ethyl.

Particular preference is given to trimethoxysilane groups, dimethoxymethylsilane groups or triethoxysilane groups.

Methoxysilane groups have the advantage that they are particularly reactive and ethoxysilane groups have the advantage that they are toxicologically advantageous and particularly storage-stable.

The silane-containing organic polymer has on average preferably 1.3 to 4, especially 1.5 to 3, particularly preferably 1.7 to 2.8, silane groups per molecule. The silane groups are preferably terminal.

The silane-containing organic polymer STP preferably has an average molecular weight in the range from 1000 to 30 000 g/mol, especially from 2000 to 20 000 g/mol. The silane-containing organic polymer preferably has a silane equivalent weight of 300 to 25 000 g/eq, especially of 500 to 15 000 g/eq.

The silane-containing organic polymer STP may be solid or liquid at room temperature. It is preferably liquid at room temperature.

It is most preferable when the silane-containing organic polymer STP is a silane-containing polyether liquid at room temperature, wherein the silane groups are especially dialkoxysilane groups and/or trialkoxysilane groups, particularly preferably trimethoxysilane groups or triethoxysilane groups.

Processes for producing silane-containing polyethers are known to a person skilled in the art.

In a preferred process silane-containing polyethers are obtainable from the reaction of allyl-containing polyethers with hydrosilanes, optionally with chain extension using diisocyanates for example.

In a further preferred process silane-containing polyethers are obtainable from the copolymerization of alkylene oxides and epoxysilanes, optionally with chain extension using diisocyanates for example.

In a further preferred process silane-containing polyethers are obtainable from the reaction of polyether polyols with isocyanatosilanes, optionally with chain extension using diisocyanates.

In a further preferred process silane-containing polyethers are obtainable from the reaction of isocyanate-containing polyethers, especially NCO-terminated urethane polyethers from the reaction of polyether polyols with a superstoichiometric amount of polyisocyanates, with aminosilanes, hydroxysilanes or mercaptosilanes. Silane-containing polyethers from this process are particularly preferred. This process enables the use of a multiplicity of commercially readily available inexpensive starting materials by means of which different polymer properties are obtainable, for example high extensibility, high strength, low modulus of elasticity, low glass transition temperature or high weathering resistance.

It is particularly preferable when the silane-containing polyether is obtainable from the reaction of NCO-terminated urethane polyethers with aminosilanes or hydroxysilanes. Suitable NCO-terminated urethane polyethers are obtainable from the reaction of polyether polyols, especially polyoxyalkylene diols or polyoxyalkylene triols, preferably polyoxypropylene diols or polyoxypropylene triols, with a superstoichiometric amount of polyisocyanates, especially diisocyanates.

It is preferable when the reaction between the polyisocyanate and the polyether polyol is conducted with exclusion of moisture at a temperature of 50° C. to 160° C., optionally in the presence of suitable catalysts, wherein the polyisocyanate has been dosed such that the isocyanate groups thereof are present in a stoichiometric excess in relation to the hydroxyl groups of the polyol. In particular the excess of polyisocyanate is chosen such that in the resulting urethane polyether after the reaction of all hydroxyl groups a content of free isocyanate groups of 0.1% to 5% by weight, preferably 0.2% to 4% by weight, particularly preferably 0.3% to 3% by weight, based on the overall polymer, remains.

Preferred diisocyanates are selected from the group consisting of 1,6-hexamethylene diisocyanate (HDI), 1-isocyanato-3,3,5-trimethyl-5-isocyanatomethylcyclohexane (isophorone diisocyanate or IPDI), 2,4- and 2,6-tolylene diisocyanate and any desired mixtures of these isomers (TDI) and 4,4'-, 2,4'- and 2,2'-diphenylmethane diisocyanate and any desired mixtures of these isomers (MDI). Particular preference is given to IPDI or TDI. Most preferred is IPDI. In this way, polyethers containing silane groups with particularly good lightfastness are obtained.

Especially suitable as polyether polyols are polyoxyalkylene diols or polyoxyalkylene triols having a degree of unsaturation below 0.02 mEq/g, in particular below 0.01 mEq/g, and an average molecular weight in the range from 400 to 25 000 g/mol, in particular 1000 to 20 000 g/mol.

In addition to polyether polyols it is also possible to use proportions of other polyols, especially polyacrylate polyols and low molecular weight diols or triols. Suitable aminosilanes for the reaction with an NCO-terminated urethane polyether are primary and secondary aminosilanes. Preference is given to 3-aminopropyltrimethoxysilane, 3-am inopropyldimethoxymethylsilane, 4-aminobutyltrimethoxysilane, 4-amino-3-methylbutyltrimethoxysilane, 4-amino-3,3-dimethylbutyltrimethoxysilane, N-butyl-3-aminopropyltrimethoxysilane, N-phenyl-3-aminopropyltrimethoxysilane, adducts formed from primary amino-silanes such as 3-am inopropyltrimethoxysilane, 3-aminopropyldimethoxy-methylsilane or N-(2-aminoethyl)-3-aminopropyltrimethoxysilane and Michael acceptors such as acrylonitrile, (meth)acrylic esters, (meth)acrylam ides, maleic or fumaric diesters, citraconic diesters or itaconic diesters, especially dimethyl or diethyl N-(3-trimethoxysilylpropyl)aminosuccinate. Likewise suitable are analogs of the recited aminosilanes with ethoxy or isopropoxy groups in place of the methoxy groups on the silicon.

Suitable hydroxysilanes for the reaction with an NCO-terminated urethane polyether are especially obtainable from the addition of aminosilanes onto lactones or onto cyclic carbonates or onto lactides.

Aminosilanes suitable for this purpose are especially 3-aminopropyltrimethoxysilane, 3-aminopropyltriethoxysilane, 4-aminobutyltrimethoxysilane, 4-aminobutyltriethoxysilane, 4-amino-3-methylbutyltrimethoxysilane, 4-amino-3-methylbutyltriethoxysilane, 4-amino-3,3-dimethylbutyltrimethoxysilane, 4-am ino-3,3-dimethylbutyltriethoxysilane, 2-aminoethyltrimethoxysilane or 2-aminoethyltriethoxysilane. Particular preference is given to 3-aminopropyltrimethoxysilane, 3-aminopropyltriethoxysilane, 4-amino-3, 3-dimethylbutyltrimethoxysilane or 4-amino-3,3-dimethylbutyltriethoxysilane.

Suitable lactones are especially γ-valerolactone, γ-octalactone, δ-decalactone, and ε-decalactone, especially γ-valerolactone.

Suitable cyclic carbonates are especially 4,5-dimethyl-1,3-dioxolan-2-one, 4,4-dimethyl-1,3-dioxolan-2-one, 4-ethyl-1,3-dioxolan-2-one, 4-methyl-1,3-dioxolan-2-one or 4-(phenoxymethyl)-1,3-dioxolan-2-one.

Suitable lactides are especially 1,4-dioxane-2,5-dione (lactide formed from 2-hydroxyacetic acid, also called "glycolide"), 3,6-dimethyl-1,4-dioxane-2,5-dione (lactide formed from lactic acid, also called "lactide") and 3,6-diphenyl-1,4-dioxane-2,5-dione (lactide formed from mandelic acid).

Preferred hydroxysilanes which are obtained in this way are N-(3-triethoxysilylpropyl)-2-hydroxypropanam ide, N-(3-trimethoxysilylpropyl)-2-hydroxypropanamide, N-(3-triethoxysilylpropyl)-4-hydroxypentanamide, N-(3-triethoxysilylpropyl)-4-hydroxyoctanam ide, N-(3-triethoxysilylpropyl)-5-hydroxydecanamide and N-(3-triethoxysilylpropyl)-2-hydroxypropyl carbamate.

Suitable hydroxysilanes are moreover also obtainable from the addition of aminosilanes onto epoxides or from the addition of amines onto epoxysilanes. Preferred hydroxysilanes which are obtained in this way are 2-morpholino-4(5)-(2-trimethoxysilylethyl)cyclohexan-1-ol, 2-morpholino-4(5)-(2-triethoxysilyl-ethyl)cyclohexan-1-ol or 1-morpholino-3-(3-(triethoxysilyl)propoxy)propan-2-ol.

Further suitable polyethers containing silane groups are commercially available products, especially the following: MS Polymer™ (from Kaneka Corp.; especially the 5203H, 5303H, S227, S810, MA903 and S943 products); MS Polymer™ or Silyl™ (from Kaneka Corp.; especially the SAT010, SAT030, SAT200, SAX350, SAX400, SAX725, MAX450, MAX951 products); Excestar® (from Asahi Glass Co. Ltd.; especially the S2410, S2420, S3430, S3630 products); SPUR+* (from Momentive Performance Materials; especially the 1010LM, 1015LM, 1050MM products); Vorasil™ (from Dow Chemical Co.; especially the 602 and 604 products); Desmoseal® (from Bayer MaterialScience AG; especially the S XP 2458, S XP 2636, S XP 2749, S XP 2774 and S XP 2821 products), TEGOPAC® (from Evonik Industries AG; especially the Seal 100, Bond 150, Bond 250 products), Polymer ST (from Hanse Chemie AG/Evonik Industries AG, especially the 47, 48, 61, 61LV, 77, 80, 81 products); Geniosil® STP (from Wacker Chemie AG; especially the E10, E15, E30, E35 products).

Particularly preferred silane-containing organic polymers have end groups of formula (II)

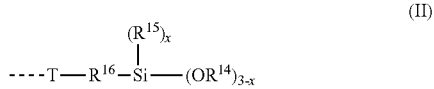

(II)

wherein
$R^{16}$ is a linear or branched divalent hydrocarbyl radical having 1 to 12 carbon atoms which optionally has cyclic and/or aromatic moieties and optionally one or more heteroatoms, especially one or more nitrogen atoms;
T is a divalent radical selected from —O—, —S—, —N($R^{17}$)—, —O—CO—N($R^{17}$)—, —N($R^{17}$)—CO—O— and —N($R^{17}$)—CO—N($R^{17}$)—,
wherein $R^{17}$ is a hydrogen radical or a linear or branched hydrocarbyl radical having 1 to 20 carbon atoms which optionally has cyclic moieties and which optionally has an alkoxysilane, ether or carboxylic ester group; and
$R^{14}$, $R^{15}$ and x are as defined above.

It is preferable when $R^{16}$ is 1,3-propylene or 1,4-butylene, wherein butylene may be substituted by one or two methyl groups.

It is particularly preferable when $R^{16}$ is 1,3-propylene.

In the composition according to the invention the silane-functional polymer STP is preferably present in an amount of 10% by weight to 50% by weight, in particular in an amount of 15% by weight to 30% by weight, based on the total composition.

The composition according to the invention contains at least one precipitated, surface-coated aluminum trihydrate ATH in a proportion of 30% to 60% by weight based on the total composition.

Aluminum trihydrate (ATH), also referred to as γ-Al(OH)$_3$ and known as the mineral gibbsite (hydrargillite), is a flame retardant additive known to a person skilled in the art. However, for the present invention only precipitated, surface-coated ATH is suitable. Commonly used milled and/or non-surface-coated types do not result in the technical effect according to the invention. Suitable as the coating are in particular hydrophobizing organic substances which are physically or chemically applied to the surface of the ATH particles by means of a suitable process. Such coating processes are known to a person skilled in the art and suitable coated ATH types are commercially available. Particularly preferred as the surface coating for ATH are alkylalkoxysilanes, in particular alkyltrialkoxysilanes, which by hydrolysis and condensation form an at least partially hydrophobic alkyl silicate layer on the particles. Very particularly preferred alkylalkoxysilanes are for example vinylalkoxysilanes, such as vinyltrimethoxysilane.

Likewise particularly preferred as the surface coating are fatty acids. These form a hydrophobic shell around the particles. A very particularly preferred fatty acid is for example stearic acid.

Particularly suitable are for example precipitated fatty-acid-coated ATH obtainable under the trade name Martinal® OL 104 C from Martinswerk, Germany or precipitated vinylsilane-coated ATH obtainable under the trade name Martinal® OL 104 ZO from Martinswerk, Germany. The surface coating is preferably present in an amount in the range from 0.01% by weight to 5% by weight, preferably in the range from 0.1 to 1% by weight based on the weight of the aluminum trihydrate ATH.

In preferred embodiments the composition according to the invention additionally contains between 0% and 25% by weight, preferably between 5% and 20% by weight, particularly preferably between 8% and 15% by weight, based on the total composition, of at least one phosphorus-containing compound PH.

Preferred phosphorus-containing compounds PH comprise aromatic or aliphatic alkyl phosphates, such as in particular triethyl phosphate, tricresyl phosphate, triphenyl phosphate, diphenyl cresyl phosphate, isodecyl diphenyl phosphate, tris(1,3-dichloro-2-propyl) phosphate, tris(2-chloroethyl) phosphate, tris(2-ethylhexyl) phosphate, tris(chloroisopropyl) phosphate, tris(chloropropyl) phosphate, isopropylated triphenyl phosphate, mono-, bis- or tris(isopropylphenyl) phosphates of different degrees of isopropylation, resorcinol bis(diphenyl phosphate), bisphenol A bis(diphenyl phosphate) and also ammonium phosphate, ammonium polyphosphates, red phosphorus and phosphoric acid.

Particularly preferred embodiments employ a liquid alkyl phosphate also suitable as a plasticizer, in particular tris(2-ethylhexyl)phosphate, obtainable for example under the trade name Disflamoll® TOF from Lanxess.

It will be appreciated that it is possible and in certain embodiments advantageous to employ different phosphorus-containing compounds PH as a mixture. A particularly advantageous mixture is for example the simultaneous use of a liquid alkl phosphate which additionally serves as a plasticizer with an ammonium polyphosphate that is intumescent. This makes it possible to achieve a particularly high fire retardancy coupled with improved mechanical properties of the composition, for example in terms of elongation at break.

It may be advantageous to add to the composition according to the invention further flame and fire retardants known to a person skilled in the art, such as for example zinc borate, melamine salts and the like.

In preferred embodiments the composition according to the invention contains between 0% and 20% by weight based on the total composition of at least one carbon additive KO.

The term carbon additive KO denotes substances consisting entirely or predominantly of carbon. Said substances preferably consist of carbon to an extent of at least 80% by weight, in particular to an extent of at least 90% by weight, particularly preferably to an extent of at least 95% by weight, based on the weight of the carbon additive KO. Especially suitable as the carbon additive KO are carbon blacks, in particular dried carbon blacks, and also expandable graphites which are intumescent. Suitable dried carbon blacks include all commonly used industrial carbon blacks such as for example Monarch® 570 obtainable from Cabot. Suitable expandable graphites likewise include all commercially available types, for example Nyagraph® 250, obtainable from Nyacol Nano Technlogies or the expandable graphites from Asbury Carbons.

In a preferred embodiment the moisture-curable composition contains as the carbon additive KO at least one expandable graphite in a proportion of between 1% and 15% by weight, preferably between 4% and 11% by weight, based on the total composition.

In a particularly preferred embodiment the moisture-curable composition contains as the carbon additive KO 3% to 10% by weight of expandable graphite and 10% to 25% by weight of an abovementioned phosphorus-containing compound PH always based on the total composition. Such a composition can after curing achieve fire retardancy class B (s2, d0), preferably B (s1, d0), according to DIN EN 13501-1.

In another preferred embodiment the moisture-curable composition contains as the carbon additive KO at least one dried carbon black in a proportion of between 1% and 15% by weight, preferably between 4% and 11% by weight, based on the total composition.

In another particularly preferred embodiment the moisture-curable composition contains as the carbon additive KO 4% to 11% by weight of dried carbon black and 7% to 15% by weight of a phosphorus-containing compound PH always based on the total composition. Such a composition can after curing achieve at least hazard level class HL2 according to DIN EN 45545-2.

In yet more preferred embodiments of said recited embodiment the composition can after curing achieve hazard level class HL3 according to DIN EN 45545-2.

A further aspect of the invention is the use of a precipitated surface-coated aluminum trihydrate ATH in combination with a dried carbon black and a phosphorous-containing compound PH for producing a moisture-curable composition which after curing achieves at least hazard level class HL2 according to DIN EN 45545-2.

A further aspect of the invention is the use of a precipitated surface-coated aluminum trihydrate ATH in combination with an expandable graphite and a phosphorous-containing compound PH for producing a moisture-curable composition which after curing achieves fire retardancy class B (s2, d0), preferably B (s1, d0), according to DIN EN 13501-1.

The composition preferably contains at least one catalyst for crosslinking the moisture-crosslinkable polymers P, in particular for crosslinking silane groups and/or for crosslinking isocyanate groups with amines or alcohols. Suitable catalysts include in particular metal compounds and/or basic nitrogen or phosphorus compounds.

Suitable metal compounds are especially compounds of tin, titanium, zirconium, aluminum or zinc, especially diorganotin(IV) compounds such as in particular dibutyltin(IV) diacetate, dibutyltin(IV) dilaurate, dibutyltin(IV) dineodecanoate or dibutyltin(IV) bis(acetylacetonate) and dioctyltin(IV) dilaurate and also titanium(IV) or zirconium(IV) or aluminum(III) or zinc(II) complexes having in particular alkoxy, carboxylate, 1,3-diketonate, 1,3-ketoesterate or 1,3-ketoamidate ligands.

Suitable organotitanates are especially titanium(IV) complexes.

Especially suitable are the commercially available products Tyzor® AA, GBA, GBO, AA-75, AA-65, AA-105, DC, BEAT, BTP, TE, TnBT, KTM, TOT, TPT or IBAY (all from Dorf Ketal); Tytan PBT, TET, X85, TAA, ET, S2, S4 or S6 (all from Borica Company Ltd.) and Ken-React® KR® TTS, 7, 9QS, 12, 26S, 33DS, 38S, 39DS, 44, 134S, 138S, 133DS, 158FS or LICA® 44 (all from Kenrich Petrochemicals).

Suitable basic nitrogen or phosphorus compounds are especially imidazoles, pyridines, phosphazene bases or preferably amines, hexahydrotriazines, biguanides, guanidines or amidines.

Suitable amines are especially alkyl, cycloalkyl or aralkylamines; amide-containing polyamines, so-called polyamidoamines, such as are commercially available for example under the trade names Versamid® (Cognis), Aradur® (Huntsman), Euretek® (Huntsman) or Beckopox® (Cytec); or aminosilanes such as in particular 3-am inopropyltrimethoxysilane, 3-aminopropyldimethoxymethylsilane, N-(2-aminoethyl)-3-aminopropyltrimethoxysilane, N-(2-aminoethyl)-3-aminopropylmethyldimethoxysilane, N-(2-aminoethyl)-N'-[3-(trimethoxysilyl)propyl]ethylenediamine or their analogues having ethoxy groups instead of the methoxy groups on the silicon.

Suitable hexahydrotriazines are especially 1,3,5-hexahydrotriazine or 1,3,5-tris(3-(dimethylamino)propyl)hexahydrotriazine.

Suitable biguanides are especially biguanide, 1-butylbiguanide, 1,1-dimethylbiguanide, 1-butylbiguanide, 1-phenylbiguanide or 1-(o-tolyl)biguanide (OTBG).

Suitable guanidines are especially 1-butylguanidine, 1,1-dimethylguanidine, 1,3-dimethylguanidine, 1,1,3,3-tetramethylguanidine (TMG), 2-(3-(trimethoxysilyl)propyl)-1,1,3,3-tetramethylguanidine, 2-(3-(methyldimethoxysilyl)propyl)-1,1,3,3-tetramethylguanidine, 2-(3-(triethoxysilyl)propyl)-1,1,3,3-tetramethylguanidine, 1,5,7-triazabicyclo[4.4.0]dec-5-ene (TBD), 7-methyl-1,5,7-triazabicyclo[4.4.0]dec-5-ene, 7-cyclohexyl-1,5,7-triazabicyclo[4.4.0]dec-5-ene, 1-phenylguanidine, 1-(o-tolyl)guanidine (OTG), 1,3-diphenylguanidine, 1,3-di(o-tolyl)guanidine or 2-guanidinobenzim idazole.

Suitable am idines are especially 1,8-diazabicyclo[5.4.0]undec-7-ene (DBU), 1,5-diazabicyclo[4.3.0]non-5-ene (DBN), 6-dibutylam ino-1,8-diaza-bicyclo[5.4.0]undec-7-ene, 6-dibutylamino-1,8-diazabicyclo[5.4.0]undec-7-ene, N,N'-di-n-hexylacetamidine (DHA), 2-methyl-1,4,5,6-tetrahydropyrimidine, 1,2-dimethyl-1,4,5,6-tetrahydropyrimidine, 2,5,5-trimethyl-1,4,5,6-tetrahydro-pyrimidine, N-(3-trimethoxysilylpropyl)-4,5-dihydroimidazole or N-(3-triethoxy-silylpropyl)-4,5-dihydroimidazole.

In addition, the composition may comprise, as cocatalyst, an acid, especially a carboxylic acid. Preference is given to aliphatic carboxylic acids such as formic acid, lauric acid, stearic acid, isostearic acid, oleic acid, 2-ethyl-2,5-dimethylcaproic acid, 2-ethylhexanoic acid, neodecanoic acid, aromatic carboxylic acids such as salicylic acid, fatty acid mixtures from the saponification of natural fats and oils or di- and polycarboxylic acids, especially poly(meth)acrylic acids.

The composition may contain further constituents, especially the following auxiliaries and admixtures:

adhesion promoters and/or crosslinkers, especially aminosilanes such as, in particular, 3-aminopropyltrimethoxysilane, 3-aminopropyldimethoxymethyl-silane, N-(2-aminoethyl)-3-aminopropyltrimethoxysilane, N-(2-aminoethyl)-3-aminopropyldimethoxymethylsilane, N-(2-aminoethyl)-N'-[3-(trimethoxysilyl)-propyl]ethylenediamine or the analogs thereof with ethoxy in place of methoxy groups, and also N-phenyl-, N-cyclohexyl- or N-alkylaminosilanes, mercaptosilanes, epoxysilanes, (meth)acrylosilanes, anhydridosilanes, carbamatosilanes, alkylsilanes or iminosilanes, oligomeric forms of these silanes, adducts formed from primary aminosilanes with epoxysilanes or (meth)acrylosilanes or anhydridosilanes, amino-functional alkylsilsesquioxanes, especially amino-functional methylsilsesquioxane or amino-functional propylsilsesquioxane. Especially suitable are 3-aminopropyltrimethoxysilane, 3-aminopropyltriethoxysilane, N-(2-aminoethyl)-3-aminopropyltrimethoxysilane, N-(2-aminoethyl)-3-aminopropyltriethoxy-silane, 3-glycidoxypropyltrimethoxysilane, 3-glycidoxypropyltriethoxysilane or 3-ureidopropyltrimethoxysilane, or oligomeric forms of these silanes;

drying agents, especially tetraethoxysilane, vinyltrimethoxysilane, vinyltriethoxysilane or organoalkoxysilanes having a functional group in the α position to the silane group, especially N-(methyldimethoxysilyl-methyl)-O-methylcarbamate, (methacryloxymethyl)silanes, methoxymethylsilanes, orthoformic esters, calcium oxide or molecular sieves, especially vinyltrimethoxysilane or vinyltriethoxysilane;

plasticizers, especially carboxylic esters such as phthalates, especially dioctyl phthalate, bis(2-ethylhexyl) phthalate, bis(3-propylheptyl) phthalate, diisononyl phthalate or diisodecyl phthalate, diesters of ortho-cyclohexanedicarboxylic acid, especially diisononyl-1, 2-cyclohexane dicarboxylate, adipates, especially dioctyl adipate, bis(2-ethylhexyl) adipate, azelates, especially bis(2-ethylhexyl) azelate, sebacates, especially bis(2-ethylhexyl) sebacate or diisononyl sebacate, polyols, especially polyoxyalkylene polyols or polyester polyols, glycol ethers, glycol esters, organic phosphoric or sulfonic acid esters, sulfonamides, polybutenes or fatty acid methyl or ethyl esters derived from natural fats or oils and also known as "biodiesel";

solvents;

inorganic or organic fillers, especially natural, ground or precipitated calcium carbonates, optionally coated with fatty acids, especially stearic acid, baryte (heavy spar), talcs, quartz flours, quartz sand, dolomites, wollastonites, kaolins, calcined kaolins, mica (potassium aluminum silicate), molecular sieves, aluminum oxides, aluminum hydroxides, magnesium hydroxide, silicas including finely divided silicas from pyrolysis processes, industrially produced carbon blacks, graphite, metal powders such as aluminum, copper, iron, silver or steel, PVC powder or hollow spheres;

fibers, especially glass fibers, carbon fibers, metal fibers, ceramic fibers or polymer fibers such as polyamide fibers or polyethylene fibers;

dyes;

pigments, especially titanium dioxide or iron oxides;

rheology modifiers, especially thickeners, especially sheet silicates such as bentonites, derivatives of castor oil, hydrogenated castor oil, polyamides, polyurethanes, urea compounds, fumed silicas, cellulose ethers or hydrophobically modified polyoxyethylenes;

stabilizers against oxidation, heat, light or UV radiation;

natural resins, fats or oils such as rosin, shellac, linseed oil, castor oil or soya oil;

non-reactive polymers such as, in particular, homo- or copolymers of unsaturated monomers, especially from the group comprising ethylene, propylene, butylene, isobutylene, isoprene, vinyl acetate or alkyl (meth)acrylates, especially polyethylenes (PE), polypropylenes (PP), polyisobutylenes, ethylene-vinyl acetate copolymers (EVA) or atactic poly-α-olefins (APAO);

surface-active substances, especially wetting agents, leveling agents, deaerating agents or defoamers;

biocides, especially algicides, fungicides or substances that inhibit fungal growth;

and other substances customarily used in curable compositions. It may be advisable to subject certain constituents to chemical or physical drying before mixing them into the composition.

In a preferred embodiment the composition contains at least one drying agent and at least one adhesion promoter.

The composition is preferably produced and stored under exclusion of moisture. With exclusion of moisture it is typically storage-stable in a suitable packaging or assembly, such as in particular a bottle, a canister, a pouch, a bucket, a vat or a cartridge.

The composition may be in the form of a one-component mixture or in the form of a multi-component, especially two-component, composition.

In the present document, "one-component" refers to a composition in which all constituents of the composition are stored in a mixture in the same container and which is curable with moisture.

In the present document, "two-component" refers to a composition in which the constituents of the composition are present in two different components which are stored in separate containers. Only shortly before or during the application of the composition are the two components mixed with one another, whereupon the mixed composition cures, optionally under the action of moisture.

Any second or optionally further components is/are mixed with the first component prior to or during application, especially by means of a static mixer or by means of a dynamic mixer.

The composition is especially applied at ambient temperature, preferably within a temperature range between 0° C. and 45° C., especially 5° C. to 35° C., and also cures under these conditions.

In the case of application when using silane-functional polymers STP the crosslinking reaction of the silane groups optionally commences under the influence of moisture. Silane groups present can condense with silanol groups present to afford siloxane groups (Si—O—Si groups). Silane groups present can also be hydrolyzed on contact with moisture to give silanol groups (Si—OH groups) and can form siloxane groups (Si—O—Si groups) through subsequent condensation reactions. As a result of these reactions, the composition ultimately cures.

If water is required for the curing, this can either come from the air (atmospheric humidity), or else the composition can be contacted with a water-containing component, for example by painting, for example with a smoothing agent, or by spraying, or water or a water-containing component can be added to the composition on application, for example in the form of a water-containing or water-releasing liquid or paste. A paste is especially suitable if the composition itself is in the form of a paste.

In the case of curing by means of atmospheric humidity, the composition cures from the outside inward, at first forming a skin on the surface of the composition. The so-called skin time is a measure of the curing rate of the composition. The speed of curing is generally determined by various factors, for example the availability of water, the temperature, etc.

The composition is suitable for a multiplicity of uses, especially as a resin for production of fiber composite, as a rigid foam, flexible foam, molding, elastomer, fiber, film or membrane, as a potting compound, sealant, adhesive, covering, coating or paint for construction and industrial applications, for example as a seam seal, cavity seal, electrical insulation compound, spackling compound, joint sealant, weld or crimp seam sealant, assembly adhesive, bodywork adhesive, glazing adhesive, sandwich element adhesive, laminating adhesive, laminate adhesive, packaging adhesive, wood adhesive, parquet adhesive, anchoring adhesive, floor covering, floor coating, balcony coating, roof coating, concrete protection coating, parking garage coating, seal, pipe coating, anticorrosion coating, textile coating, damping element, sealing element or spackling compound.

The composition is particularly suitable as an adhesive and/or sealant, especially for joint sealing and for elastic adhesive bonding in construction and industrial applications, and as an elastic coating with crack-bridging properties, especially for protection and/or sealing of roofs, floors, balconies, parking decks or concrete pipes, for example, and also as an adhesive and/or sealant in the production, repair and fitout of means of transport such as for example rail transport vehicles, road transport vehicles, aircraft and ships.

The composition is thus preferably an adhesive or a sealant or a coating.

A composition of this kind typically comprises plasticizers, fillers, adhesion promoters and/or crosslinkers and drying agents and optionally further auxiliaries and additives.

For use as an adhesive or sealant the composition preferably has a pasty consistency with pseudoplastic properties. A pasty sealant or adhesive of this kind is especially applied to a substrate from standard cartridges which are operated manually with compressed air or with a battery, or from a vat or hobbock via a delivery pump or an extruder, optionally via an application robot. For use as a coating the composition preferably has a liquid consistency at room temperature with self-leveling properties. It may be slightly thixotropic, such that the coating is applicable to sloping to vertical surfaces without flowing away immediately. It is especially applied by means of a roller or brush or by pouring-out and distribution by means, for example, of a roller, a scraper or a notched trowel.

During application the composition is preferably applied to at least one substrate.

Suitable substrates are especially
 glass, glass ceramic, concrete, mortar, brick, tile, gypsum and natural rocks such as limestone, granite or marble;
 metals and alloys such as aluminum, iron, steel or nonferrous metals, and also surface-finished metals or alloys such as galvanized or chromed metals;
 leather, textiles, paper, wood, wood-based materials bonded with resins, for example phenolic, melamine or epoxy resins, resin-textile composites and further polymer composites;
 plastics such as polyvinyl chloride (rigid and flexible PVC), acrylonitrile-butadiene-styrene copolymers (ABS), polycarbonate (PC), polyamide (PA), polyesters, poly(methyl methacrylate) (PMMA), epoxy resins, polyurethanes (PUR), polyoxymethylene (POM), polyolefins (PO), polyethylene (PE) or polypropylene (PP), ethylene/propylene copolymers (EPM) and ethylene/propylene/diene terpolymers (EPDM), and fiber-reinforced plastics such as carbon fiber-reinforced plastics (CFP), glass fiber-reinforced plastics (GFP) and sheet molding compounds (SMC), where the plastics may preferably have been surface-treated by means of plasma, corona or flames;
 coated substrates such as powder-coated metals or alloys;
 paints or varnishes, especially automotive topcoats.

If required, the substrates can be pretreated prior to the application of the composition, especially by chemical and/or physical cleaning methods or by the application of an adhesion promoter, an adhesion promoter solution or a primer.

It is possible to bond or seal two identical or two different substrates, especially the aforementioned substrates.

After the curing of the composition with water, especially in the form of atmospheric humidity, a cured composition is obtained.

The use of the composition affords an article which has in particular been bonded, sealed or coated with the composition. The article is especially a built structure, especially a structure built by structural engineering or civil engineering, an industrially manufactured item or a consumable item, especially a window, a domestic appliance or a means of transport such as in particular an automobile, a bus, a truck, a rail vehicle, a ship, an aircraft or a helicopter; or the article may be an installable component thereof.

EXAMPLES

Recited hereinbelow are working examples intended to more particularly elucidate the invention described. It will be appreciated that the invention is not restricted to these described working examples.

"Standard climatic conditions" refer to a temperature of 23±1° C. and a relative air humidity of 50±5%.

Shore A hardness was determined according to DIN 53505, measured after 7 of 14 days at standard climatic conditions ("NK"; 23° C., 50% relative humidity) using disk-shaped test specimens having a diameter (circular) of 42 mm and a thickness (height) of 6 mm. In some experiments the measurement was repeated after storage in an oven at a particular temperature. The data for temperature and residence time in the oven are reported in the respective tables.

The skin time (HBZ) was determined by applying a few grams of the composition to cardboard in a film thickness of about 2 mm and measuring under standard climatic conditions the time until, upon gentle tapping of the surface of the composition using an LDPE pipette, no residue remained on the pipette for the first time.

The mechanical properties of tensile strength, elongation at break and modulus of elasticity (at 0-5% elongation) were measured in accordance with DIN EN 53504 at an extension rate of 200 mm/min.

The tensile shear strength was determined based on ISO 4587/DIN EN 1465 on a Zwick/Roell Z005 tensile tester, wherein in each case two identical substrates were bonded to one another (bonding area: 12×25 mm; film thickness: 4.0 mm; measuring rate: 20 mm/min; substrate: float glass, PVC and aluminum; temperature: 23° C. (unless otherwise stated)).

The tear propagation resistance was determined according to DIN 53515 using films cured for 14 days at 23° C. and 50% relative humidity having a film thickness of 2 mm.

Production of Polymers P

Isocyanate-Comprising Polyurethane Polymer PU-1

500 g of polyoxypropylene diol (Acclaim® 4200 N, Covestro; OH number 28.1 mg KOH/g), 2000 g of polyoxypropylene polyoxyethylene triol (Caradol® MD34-02, Shell; OH number 35.0 mg KOH/g) and 245 g of tolylene diisocyanate (TDI; Desmodur® T 80 P, Covestro) were reacted at 80° C. to afford an NCO-terminated polyurethane polymer having a content of free isocyanate groups as determined by titrimetry of 1.88% by weight. The isocyanate-comprising polymer was cooled to room temperature and stored under exclusion of moisture.

Silane-Functional Polymer STP-1

Under exclusion of moisture 1000 g of Acclaim® 12200 polyol (from Covestro; low monol polyoxypropylenediol, OH number 11.0 mg KOH/g, water content around 0.02% by weight), 35.2 g of isophorone diisocyanate (Vestanat® IPDI from Evonik Industries), 122.5 g of diisononyl 1,2-cyclohexanedicarboxylate (Hexamoll® DINCH® from BASF) and 0.12 g of dibutyltin dilaurate were heated to 90° C. with continuous stirring and maintained at this temperature until the content of free isocyanate groups as determined by titrimetry had reached a value of 0.39% by weight. Subsequently, 36.9 g of diethyl N-(3-trimethoxysilylpropyl) aminosuccinate (adduct of 3-aminopropyltrimethoxysilane and diethyl maleate; produced as per U.S. Pat. No. 5,364,955) were mixed in and the mixture was stirred at 90° C. until it was no longer possible to detect any free isocyanate by FT-IR spectroscopy. The silane-functional polymer was cooled to room temperature and stored under exculsion of moisture.

Silane-Functional Polymer STP-2

Under exclusion of moisture 1000 g of Acclaim® 12200 polyol (from Covestro; low monol polyoxypropylenediol, OH number 11.0 mg KOH/g, water content around 0.02% by weight), 43.6 g of isophorone diisocyanate (Vestanat® IPDI from Evonik Industries), 126.4 g of triethylene glycol bis(2-ethylhexanoate) (Solusolv® 2075 from Eastman Chem.) and 0.12 g of dibutyltin dilaurate were heated to 90° C. with continuous stirring and maintained at this temperature until the content of free isocyanate groups as determined by titrimetry had reached a value of 0.63% by weight. Subsequently, 62.3 g of diethyl N-(3-trimethoxysilylpropyl) aminosuccinate (adduct of 3-aminopropyltrimethoxysilane and diethyl maleate; produced as per U.S. Pat. No. 5,364,955) were mixed in and the mixture was stirred at 90° C. until it was no longer possible to detect any free isocyanate by FT-IR spectroscopy. The silane-functional polymer was cooled to room temperature and stored under exclusion of moisture.

Production of Latent Curing Agents

Aldimine 1

(N,N'-bis(2,2-dimethyl-3-lauroyloxypropylidene)-3-aminomethyl-3,5,5-trimethylcyclohexylamine)

50.00 g of 2,2-dimethyl-3-lauroyloxypropanal were initially charged in a round-bottomed flask under a nitrogen atmosphere. With stirring, 13.93 g of 3-aminomethyl-3,5,5-trimethylcyclohexylamine were added and then the volatile constituents were removed at 80° C. and a vacuum of 10 mbar.

A pale yellow liquid having an amine value of 153.0 mg KOH/g was obtained.

Production of Moisture-Curable Compositions

In tables 2 to 4 comparative examples are labelled "(Ref.)". The raw materials employed are described in table 1.

Raw Materials Employed

TABLE 1

Employed raw materials in example formulations

| Raw material | Producer/description |
|---|---|
| Disflamoll TOF | tris(2-ethylhexyl) phosphate (Disflamoll ® TOF; Lanxess) |
| Chalk 1 (dried) | Ground calcium carbonate (Omyacarb ® 5-GU; Omya) |
| Carbon black (dried) | Carbon black (Monarch ® 570; Cabot) |
| ATH 1 (dried) | Ground, uncoated ATH (Micral ® AM500, Huber) |
| ATH 2 (dried) | Precipitated, vinylsilane-coated ATH (Martinal ® OL 104 ZO, Martinswerk) |
| ATH 3 (dried) | Ground, uncoated ATH (SB 632, Huber) |
| ATH 4 (dried) | Ground, uncoated ATH (MoldX ® P18; Huber) |
| ATH 5 (dried) | Precipitated, uncoated ATH (Martinal ® OL 104 LEO, Martinswerk) |
| ATH 6 (dried) | Precipitated, fatty-acid-coated ATH (Martinal ® OL 104 C, Martinswerk) |
| ATH 7 (dried) | Ground, uncoated ATH (MoldX ® P18; Huber) |
| ATH 8 (dried) | Precipitated, uncoated ATH (Hymod ® M6400, Huber) |
| Titanium dioxide | Kronos ® 2500; Kronos |
| Phosphate | Ammonium polyphosphate (JLS-APP; JLS) |
| Expandable graphite | Nyagraph ® 250; Nyacol Nano Technologies |
| Rheology additive | Thixatrol ® ST; Elementis |
| Catalyst 1 | 4% by weight dibutyltin dilaurate in Hexamoll DINCH |
| Catalyst 2 | 5% by weight salicylic acid in Disflamoll TOF |
| Drying agent | Vinyltrimethoxysilane (Silquest ® A-171; Momentive) |
| Adhesion promoter | N-(2-aminoethyl)-3-aminopropyltrimethoxysilane (Silquest ® A-1110; Momentive) |

Production of Polyurethane Compositions Z-1 to Z-5

In a vacuum mixer in each case the polyurethane polymer PU-1 together with the plasticizer and the Aldimine-1 were initially charged under nitrogen and the filler (chalk, carbon black and/or ATH) was added and mixed in. Subsequently the catalyst was added and mixed in under vacuum at 1000-1200 rpm over 20 min to obtain a homogeneous paste. This was then filled into airtight cartridges and used later to produce the test specimens. The precise quantities (in % by weight based on the total composition in each case) of the individual raw materials for the respective experiments are shown in table 2.

TABLE 2

Compositions Z-1 to Z-5 in % by weight in each case based on the total composition.

|  | Z-1 | Z-2 (Ref.) | Z-3 | Z-4 | Z-5 (Ref.) |
|---|---|---|---|---|---|
| Polymer PU-1 | 25 | 25 | 25 | 25 | 25 |
| Disflamoll TOF | 12 | 12 | 12 | 12 | 12 |
| Aldimine-1 | 2 | 2 | 2 | 2 | 2 |
| Chalk 1 (dried) |  |  |  |  | 60 |
| Carbon black (dried) |  |  | 5 | 10 |  |
| ATH 1 (dried) |  | 60 |  |  |  |
| ATH 2 (dried) | 60 |  | 55 | 50 |  |
| Catalyst 1 | 0.5 | 0.5 | 0.5 | 0.5 | 0.5 |
| Catalyst 2 | 0.5 | 0.5 | 0.5 | 0.5 | 0.5 |
| TOTAL | 100 | 100 | 100 | 100 | 100 |

Production of STP Compositions Z-6 to Z-17

In a vacuum mixer the silane-functional polymer STP-1 or STP-2, plasticizer and drying agent were thoroughly mixed in the weight fractions reported in tables 3 to 5 over 5 minutes. Subsequently the respective filler (and the raw materials titanium dioxide, rheology additive, expandable graphite and phosphate not used in all formulations) was incorporated by kneading at 60° C. over 15 minutes. With the heating means switched off, adhesion promoter and catalyst were then added and the mixture was processed into a homogeneous paste under vacuum over 10 minutes. Said paste was then filled into internally coated aluminum applicator gun cartridges and, after storage, further used for the test specimens. The precise quantities (in % by weight based on the total composition in each case) of the individual raw materials for the respective experiments are shown in tables 3 to 5.

TABLE 3

Compositions Z-6 to Z-9 in % by weight in each case based on the total composition.

|  | Z-6 | Z-7 | Z-8 | Z-9 (Ref.) |
|---|---|---|---|---|
| Polymer STP-2 | 25 | 25 | 25 | 25 |
| Disflamoll TOF | 11.5 | 11.5 | 11.5 | 11.5 |
| Drying agent | 1.5 | 1.5 | 1.5 | 1.5 |
| Carbon black (dried) |  | 5 | 10 |  |
| ATH 3 (dried) |  |  |  | 60 |
| ATH 2 (dried) | 60 | 55 | 50 |  |
| Adhesion promoter | 1 | 1 | 1 | 1 |
| Catalyst 1 | 1 | 1 | 1 | 1 |
| TOTAL | 100 | 100 | 100 | 100 |

TABLE 4

Compositions Z-10 to Z-13 in % by weight in each case based on the total composition.

|  | Z-10 (Ref.) | Z-11 (Ref.) | Z-12 | Z-13 |
|---|---|---|---|---|
| Polymer STP-1 | 24 | 24 | 24 | 24 |
| Disflamoll TOF | 15 | 15 | 15 | 15 |
| Drying agent | 2 | 2 | 2 | 2 |
| Titanium dioxide | 2 | 2 | 2 | 2 |
| Rheology additive | 3 | 3 | 3 | 3 |
| ATH 4 (dried) | 51.7 |  |  |  |
| ATH 5 (dried) |  | 51.7 |  |  |
| ATH 6 (dried) |  |  | 51.7 |  |
| ATH 2 (dried) |  |  |  | 51.7 |
| Adhesion promoter | 1 | 1 | 1 | 1 |
| Catalyst 1 | 1.3 | 1.3 | 1.3 | 1.3 |
| TOTAL | 100 | 100 | 100 | 100 |

TABLE 5

Compositions Z-14 to Z-19 in % by weight in each case based on the total composition.

|  | Z-14 (Ref.) | Z-15 (Ref.) | Z-16 (Ref.) | Z-17 | Z-18 | Z-19 |
|---|---|---|---|---|---|---|
| Polymer STP-2 | 24 | 24 | 24 | 20 | 20 | 20 |
| Disflamoll TOF | 15 | 15 | 15 | 16.5 | 16.5 | 16.5 |
| Drying agent | 2 | 2 | 2 | 2 | 2 | 2 |
| Titanium dioxide | 2 | 2 | 2 | 2 | 2 | 2 |
| Rheology additive | 3 | 3 | 3 |  |  |  |
| Phosphate |  |  |  | 8 | 8 | 10 |
| Expandable graphite |  |  |  | 4 | 6 | 4 |
| ATH 7 (dried) | 51.7 |  |  |  |  |  |
| ATH 4 (dried) |  | 51.7 |  |  |  |  |
| ATH 8 (dried) |  |  | 51.7 |  |  |  |
| ATH 2 (dried) |  |  |  | 45 | 43 | 43 |
| Adhesion promoter | 1 | 1 | 1 | 1 | 1 | 1 |
| Catalyst 1 | 1.3 | 1.3 | 1.3 | 1.5 | 1.5 | 1.5 |
| TOTAL | 100 | 100 | 100 | 100 | 100 | 100 |

Measured Results

The measured results as per the above-described methods are shown in tables 6 to 9.

TABLE 6

Test results for compositions Z-1 to Z-5. A Shore A hardness value of 0 means the sample was destroyed by the heat.

|  | Z-1 | Z-2 (Ref.) | Z-3 | Z-4 | Z-5 (Ref.) |
|---|---|---|---|---|---|
| Tensile strength [MPa] | 2.4 | 0.8 | 3.3 | 4.3 | 1.15 |
| Elongation at break [%] | 545 | 914 | 316 | 257 | 352 |
| Tensile shear strength [MPa] | 1.82 | 0.81 | 2.96 | 3.48 | 0.87 |
| Elastic modulus (0-5%) [MPa] | 1.5 | 0.5 | 1.8 | 2.5 | 1.6 |
| Shore A (7 d RT) | 41 | 23 | 49 | 45 | 39.1 |
| Shore A (7 d RT) + 1 h 120° C. | 38.3 | 11.4 | 42.7 | 45.5 | 27.2 |
| Shore A (7 d RT) + 4 h 120° C. | 31.8 | 0 | 37.9 | 44.7 | 0 |
| Shore A (7 d RT) + 8 h 120° C. | 26.7 | 0 | 34.5 | 42 | 0 |
| Shore A (7 d RT) + 1 h 140° C. | 25.4 | 0 | 33.6 | 37.6 | 38.8 |
| Shore A (7 d RT) + 4 h 140° C. | 9.5 | 0 | 20.5 | 30 | 0 |
| Shore A (7 d RT) + 8 h 140° C. | 0 | 0 | 14.7 | 27.5 | 0 |

TABLE 7

Test results for compositions Z-6 to Z-9

|  | Z-6 | Z-7 | Z-8 | Z-9 (Ref.) |
|---|---|---|---|---|
| Tensile strength [MPa] | 2.65 | 3.86 | 3.51 | 2.58 |
| Elongation at break [%] | 114 | 123 | 88 | 87 |
| Tensile shear strength [MPa] | 1.48 | 2.37 | 2.53 | 1.38 |
| Elastic modulus (0-5%) [MPa] | 2.3 | 4.2 | 7.7 | 2.9 |
| Shore A (14 d RT) | 52 | 63 | 72 | 57 |
| Shore A (14 d RT) + 2 h 120° C. | 50 | 60.3 | 69.2 | 54.2 |
| Shore A (14 d RT) + 4 h 120° C. | 49.7 | 61.5 | 70 | 54.5 |
| Shore A (14 d RT) + 6 h 120° C. | 48.7 | 60.7 | 71.3 | 55 |
| Shore A (14 d RT) + 8 h 120° C. | 47.3 | 61.3 | 70 | 53 |

TABLE 8

Test results for compositions Z-10 to Z-13

|  | Z-10 (Ref.) | Z-11 (Ref.) | Z-12 | Z-13 |
|---|---|---|---|---|
| Tensile strength [MPa] | 1.7 | 2.4 | 1.6 | 1.6 |
| Elongation at break [%] | 260 | 350 | 600 | 560 |
| Tear propagation resistance [N/mm] | 4.0 | 5.2 | 12.0 | 9.0 |
| Elastic modulus (0-5%) [MPa] | 0.7 | 0.7 | 1.7 | 1.3 |
| Shore A (14 d RT) | 26 | 30 | 33 | 31 |
| Skin time (min) | 35 | 45 | 50 | 50 |

TABLE 9

Test results for compositions Z-14 to Z-19.

|  | Z-14 (Ref.) | Z-15 (Ref.) | Z-16 (Ref.) | Z-17 | Z-18 | Z-19 |
|---|---|---|---|---|---|---|
| Tensile strength [MPa] | 3 | 2.9 | 3 | 1.8 | 1.5 | 1.5 |
| Elongation at break [%] | 120 | 140 | 180 | 101 | 93 | 93 |
| Tear propagation resistance [N/mm] | 3.2 | 3.4 | 4.0 | 3.5 | 3.5 | 3.3 |
| Elastic modulus (0-5%) [MPa] | 2.5 | 2.3 | 2.4 | 2.2 | 2.3 | 1.9 |
| Shore A (14 d RT) | 50 | 50 | 50 | n/m | n/m | n/m |
| Skin time (min) | 50 | 60 | 50 | 18 | 16 | 14 |
| SBI Test (DIN EN 13501-1) | C (s2, d0) | n/m | n/m | B (s2, d0) | B (s1, d0) | B (s1, d0) |

"n/m" means that this value was not measured.

The measured results in tables 6 to 9 clearly show that the inventive compositions are superior to the noninventive examples in terms of heat stability, fire properties and mechanics. This shows that irrespective of whether a silane-functional polymer STP or an isocyanate-comprising polyurethane polymer PU is used these properties are only achieved through use of a precipitated, surface-coated aluminum trihydrate ATH. Moreover, further improved properties may also be achieved through the use of carbon black or expanded clay.

The invention claimed is:

1. A moisture-curable sealant or adhesive composition comprising:
    a) a moisture-reactive polymer component in a proportion of 10% to 50% by weight based on a total weight of the composition, the moisture-reactive polymer component consisting of at least one organic polymer STP containing silane groups,
    wherein a polymer backbone of the at least one organic polymer STP containing silane groups is a polyether,
    b) at least one precipitated, surface-coated aluminum trihydrate ATH in a proportion of 30% to 60% by weight based on the total weight of the composition,
    c) between 5% and 20% by weight based on the total weight of the composition of at least one phosphorus-containing compound PH comprising a mixture of a liquid alkyl phosphate and ammonium polyphosphate, and
    d) at least one carbon additive KO that comprises expandable graphite in an amount between 1% to 15% by weight based on the total weight of the composition,
    wherein:
    within a temperature range of from 5° C. to 35° C., the moisture curable composition can be applied to a substrate and is curable, and
    the at least one precipitated, surface-coated aluminum trihydrate ATH provides a synergistic effect that leads to higher tensile strength, higher elongation, and higher tensile shear strength compared to compositions using standard ATH when used together with the moisture-reactive polymer component.

2. The moisture-curable sealant or adhesive composition according to claim 1, wherein the at least one precipitated, surface-coated aluminum trihydrate ATH comprises a surface coating of vinyl silanes or fatty acids.

3. The moisture-curable sealant or adhesive composition according to claim 1, wherein the composition additionally comprises a latent curing agent.

4. The moisture-curable sealant or adhesive composition according to claim 3, wherein the at least one carbon additive KO further comprises at least one dried carbon black in a proportion between 1% and 15% by weight, based on the total weight of the composition.

5. The moisture-curable sealant or adhesive composition according to claim 4, wherein:
    the at least one dried carbon black is present in an amount in a range of from 4% to 11% by weight and the at least one phosphorus-containing compound PH is present in an amount in a range of from 7% to 15% by weight based on the total weight of the composition, and
    the composition is configured to achieve at least hazard level class HL2 according to DIN EN 45545-2 after curing.

6. The moisture-curable sealant or adhesive composition according to claim 1, wherein the at least one organic polymer STP containing silane groups has end groups of formula (II)

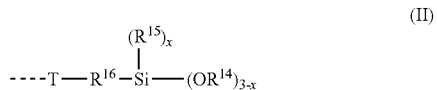

where:
R$^{14}$ is a linear or branched, monovalent hydrocarbyl radical having 1 to 5 carbon atoms;
R$^{15}$ is a linear or branched, monovalent hydrocarbyl radical having 1 to 8 carbon atoms;
x has a value of 0 or 1 or 2;
R$^{16}$ is a linear or branched divalent hydrocarbyl radical having 1 to 12 carbon atoms which may have cyclic and/or aromatic moieties and optionally one or more heteroatoms;
T is a divalent radical selected from —O—, —S—, —N(R$^{17}$)—, —O—CO—N(R$^{17}$)—, —N(R$^{17}$)—CO—O— and —N(R$^{17}$)—CO—N(R$^{17}$)—, and
R$^{17}$ is a hydrogen radical or a linear or branched hydrocarbyl radical having 1 to 20 carbon atoms which may have cyclic moieties and which may have an alkoxysilane, ether or carboxylic ester group.

7. The moisture-curable sealant or adhesive composition according to claim 1, wherein:
    the expandable graphite is present in an amount in a range of from 3% to 10% by weight and the at least one phosphorus-containing compound PH is present in an amount in a range of from 10% to 20% by weight based on the total weight of the composition, and
    the composition is configured to achieve fire retardancy class B (s2, d0) according to DIN EN 13501-1 after curing.

8. An adhesive, sealant or coating comprising the moisture-curable sealant or adhesive composition according to claim 1.

9. A built structure or article of manufacture that has been bonded, sealed or coated with the adhesive, sealant or a coating according to claim 8.

10. A cured composition of the moisture-curable sealant or adhesive composition according to claim 1, cured within a temperature range of from 5° C. to 35° C.

11. The moisture-curable sealant or adhesive composition according to claim 1, wherein the expandable graphite is present as the carbon additive KO in an amount in a range of from 3% to 10% by weight and the at least one phosphorus-containing compound PH is present in an amount in a range of from 10% to 20% by weight based on the total weight of the composition.

\* \* \* \* \*